Jan. 20, 1959

K. NAGAI ET AL 2,870,270

MAGNETIC REPRODUCING SYSTEMS

Filed Feb. 2, 1955

United States Patent Office 2,870,270

Patented Jan. 20, 1959

2,870,270

MAGNETIC REPRODUCING SYSTEMS

Kenzo Nagai, Sendai, and Saburo Uemura, Kitatama-Gun, Tokyo, Japan

Application February 2, 1955, Serial No. 485,712

Claims priority, application Japan February 8, 1954

4 Claims. (Cl. 179—100.2)

This invention relates to a magnetic reproducing system, and more particularly to an improved magnetic reproducing system which enables to reproduce a signal recorded on a magnetic medium by detecting inductance changes of a high frequency inductance coil mounted on a magnetic core member of a magnetic reproducing head.

In a magnetic reproducing system, an ordinary magnetic reproducing head heretofore known reproduces a voltage which is proportional to the change rate of a magnetic flux, with respect to time, induced in the reproducing head from a recorded magnetic medium. Accordingly the frequency characteristic of such a magnetic reproducing system is proportional to frequency and not linear thereto.

The magnetic reproducing of this type has generally a disadvantage that signal waves cannot be reproduced with desired fidelity in the case of a low frequency range or of a low speed of the recorded magnetic medium.

It has been proposed in the prior art to overcome such a disadvantage by using a reproducing head based upon the principle of a so-called magnetic amplifier. But such a reproducing head has a disadvantage of being complicated in construction.

One object of this invention is to provide a magnetic reproducing system which is capable of obtaining faithful reproduction of signal waves over the wide range from a low frequency to a relatively higher frequency, irrespective of the speed of the medium.

Another object of this invention is to provide a magnetic reproducing system in which a particular signal such as of an extraordinary low frequency current including a direct current or of a transient current can be effectively reproduced.

A further object of this invention is to provide a magnetic reproducing system in which the direct current biasing magnetic field to be established in the air gap of the head core is reduced or cancelled and the characteristic features of the system are not affected by the outer circumstances such as temperature change and operative conditions of electrical circuits associated with the head.

In accordance with this invention, a high frequency alternating current oscillator is provided for producing a current having a frequency higher than that of a signal wave. Associated to a core member of a magnetic head is a high frequency inductance coil to which high frequency current from the high frequency current oscillator is supplied. Means are also provided for detecting inductance changes of the high frequency inductance coil regarding to the high frequency current, which inductance changes are caused by the variation of the magnetic flux in the air gap of the head along which a recorded magnetic medium such as a magnetic tape is moving.

The detecting means can be carried out into effect in various modifications. For example, a tuning circuit is provided by connecting the high frequency inductance coil in shunt with a condenser which is tuned with respect to the inductance of the coil so as to give a resonant condition to the high frequency. An electrical circuit is also provided for detecting the tuning deviation of the tuning circuit, caused by the inductance variation of the coil. Another example of the detecting means is a Wheatstone bridge, one arm of which is composed of the high frequency inductance coil, thereby indicating the inductance change of the coil in the unequilibrium condition of the Wheatstone bridge.

In the case of connecting the high frequency inductance coil to the magnetic reproducing head, on one hand, a direct current biasing magnetic field is established in the reproducing air gap of the head core, because of the fact that the high frequency magnetic field passes in the head core and that the core generally has the non-linearity or the residual magnetism. This biasing field causes the demagnetizing action and noises. On the other hand, however, in order to obtain effective change of the magnetic flux induced in the core member of the head from the magnetic medium, it is necessary to give an adequate strength of the biasing field to the core member and to increase the density of the magnetic flux induced from the magnetic medium. Accordingly, it is clear that the above two conditions are contradictive.

In order to satisfy the above conditions, the cross sectional area of one part of the core member is particularly made small to have substantially large magnetic resistance as compared with that of the magnetic parts forming the air gap.

It can be understood, in this construction, that even though a suitable biasing magnetic flux is given for the narrow part of the core member, the biasing magnetic field at the air gap caused thereby becomes smaller in inverse proportion to the area of the air gap. Accordingly, the latter magnetic field can be so determined as not to disturb the reproducing operation. Moreover the density of the magnetic flux in the narrow part of the core member is inversely proportional to the cross sectional area thereof so that the density of the flux induced from the medium can be so large to increase the sensibility in reproducing. In this case the biasing magnetic field can be given by permanent magnetization of the core member caused by the residual magnetism.

For the same purpose, we prefer to provide two high frequency inductance coils which are symmetrically disposed with respect to the core member. In order to give the direct current biasing field to the core member, a permanent magnet is so attached to the core member that the core member has two symmetrical direct current magnetic paths with respect to the air gap, the fluxes in the direct current magnetic paths being cancelled by each other. This arrangement can well satisfy the two conditions above mentioned. The two high frequency coils, each having a condenser in shunt therewith, are respectively connected to two electrical circuits which are differentially connected to each other to form a balanced circuit. By this connection, the outer conditions such as voltage and frequency changes of an alternating current source and inductance changes of the high frequency coils due to the temperature changes are cancelled by the balanced circuit, but the output voltages of these two circuits corresponding to the inductance changes of the coils caused by the signal itself can additionally be led out from the output side of the balanced circuit.

This invention will be more fully understood from the following detailed description referring to the accompanying drawing, in which.

Figure 1:
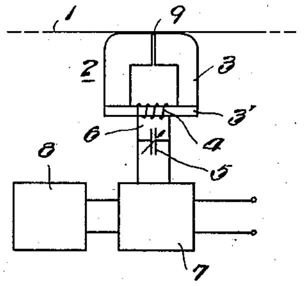
Fig. 1 is a diagrammatic illustration of a magnetic reproducing system embodying this invention.

Referring now to Fig. 1 of the drawing, 1 is a paramagnetic medium such as a magnetic tape on which some signals have been recorded. 2 designates a magnetic reproducing head. 4 is a high frequency inductance coil mounted on a magnetic core member 3' of the head.

To detect the inductance variation of the high frequency inductance coil 4, a high frequency tuning circuit 6 is formed by connecting a condenser 5 in shunt with the high frequency inductance coil. A high frequency current oscillator 8 is associated to the high frequency tuning circuit 6 for supplying a high frequency current thereto. 7 is a rectifier for detecting the voltage of the tuning circuit 6.

Thus, the detuning or tuning deviation of the tuning circuit 6 to the high frequency current is detected, which deviation occurs with the inductance change of the high frequency coil 4 caused by a signal wave recorded on the medium when it is moving along an air gap 9 of the core member 3, thereby reproducing the corresponding signal current. The tuning circuit 6 can also be formed as one part of the high frequency oscillator 8, for example as the tank circuit thereof. In this case, the variation in the oscillation frequency, caused by the inductance variation, can be detected so as to obtain the corresponding signal. The magnetic member has a portion 3 forming the air gap 9 and another portion 3' the cross sectional area of which is substantially small as compared with that of the portion 3. It is preferably that core portions 3 and 3' are made of magnetic material having high permeability and low high frequency loss such as oxide or ferrite cores.

Figure 2:
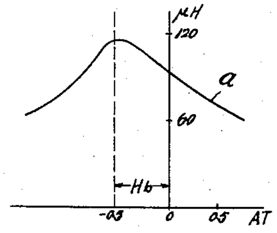
Fig. 2 is a curve illustrating the inductance of a high frequency inductance coil against the ampere-turns of a reproducing head.

Fig. 2 is a graph showing the inductance *a* of the coil in microhenries (μH) plotted against the magnetization force of the field in ampere-turns (AT). As is clearly shown in this figure, the core member is biased by H*b* which will be simply obtained by permanently magnetizing the core member owing to its residual magnetization feature. Should a recorded magnetic tape be attached to the core member at its air gap, this inductance varies in proportion to the positive and negative values of the magnetic flux induced from the tape. There occurs a tuning deviation to the high frequency current in the tuning circuit 6 due to the inductance change of the coil 4 so that a signal voltage is produced across the terminals of the detecting circuit 7.

Figure 3:
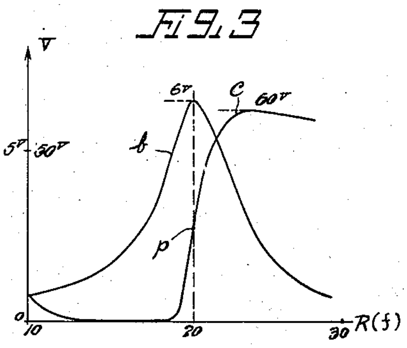
Fig. 3 is a diagram illustrating the relationship between a detected output voltage and a voltage of a tuning circuit shown in Fig. 1.

Fig. 3 is curves showing the voltage *b* of the tuning circuit and the rectified voltage *c* of the rectifier both in volts plotted against a condenser reading (R) of the condenser 5 in degrees or the frequency (*f*). It has been found that the tuned point is set substantially a midpoint P on the straightly stretched detected voltage curve *c* by the biasing field based upon the permanent magnetization feature of the core member. This rectified voltage curve corresponds to the output voltage characteristic feature of the system and its straight portion shows a steep slope. Accordingly, if the voltage of the tuning circuit varies along the curve *b* with the inductance variation based upon the varying flux in the core member, the output voltage of this system is produced along the curve *c*, which output voltage is sufficiently large even in the case of a feeble inductance variation of the coil 4.

According to this invention, a signal output voltage is proportional to the amount of the flux passing through the core member so that the reproduced voltage is substantially flat, irrespective of what range of the signal frequency which is out of the question for the air gap is present. Besides, this invention has advantages that the output voltage does not depend upon the speed of the medium and that the head used is simple and compact in construction owing to the fact that turns of the coil 4 can be reduced minimum. Moreover, the output voltage can sensitively be obtained due to the straight and steep characteristic curve of the system. In practice, the output voltage of about 1 volt or more can easily be obtained without distortion.

If relatively higher tuning frequency such for example as ranging from 50 kilocycles to 1 megacycle per second will be selected, the flux induced in the core member can be reduced in inversely proportion to the frequency used. In this case the head can be made smaller and separation between the high frequency and the signal frequencies is facilitated, which enables to reproduce a signal of relatively higher frequencies.

It is of course that this invention can be applied to reproduce an ordinary sound wave recording, but one of the most important features of this invention is such that it can be also applied to reproduction of such recording as of a direct current, very low frequency signal or transient voltage, which is difficult or even impossible in reproduction by heretofore known ordinary reproducing systems.

Figure 4:
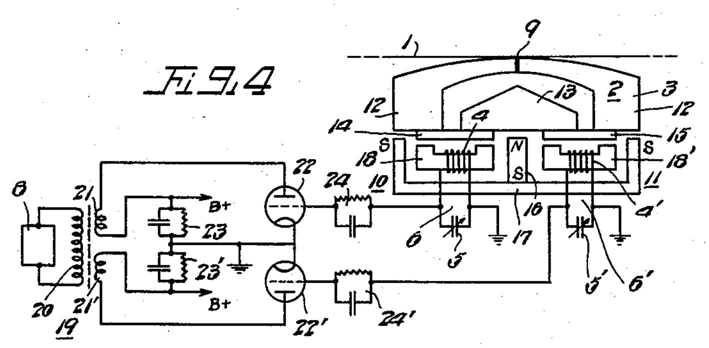
Fig. 4 is another embodiment of this invention, a reproducing head being enlarged and connected to a balanced circuit.
Figure 5:
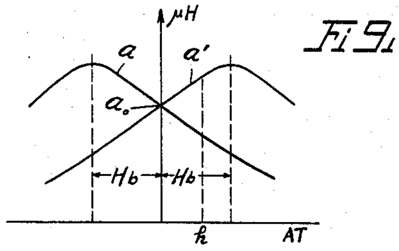
Fig. 5 is a diagram illustrating inductance changes of two high frequency coils with respect to the magnetization force of the head shown in Fig. 4.

Fig. 4 is a diagrammatic view of another embodiment of this invention. In this example, symmetrically attached to the core member 3 is a pair of direct current magnetic paths 10 and 11. To this end, the core member is constituted of outer portions 12 and an inner portion 13 which are preferably made of Permalloy cores. The opposite ends of these portions are respectively bridged by cores 14 and 15 preferably made of ferrite cores to form a signal magnetic path including an air gap 9. Disposed between the cores 14 and 15 and traversely thereto is a permanent magnet 16 which is mounted on a yoke 17 both ends of which are respectively opposite to the outer ends of the core member 12, thereby forming a pair of direct current magnetic paths which are symmetrically positioned with respect to the core member and include the cores 14 and 15 respectively. Opposite respectively to the core 14 and core 15 is also disposed another pair of cores 18 and 18' preferably made of ferrite cores on which high frequency inductance coils 4 and 4' are respectively mounted. Connected respectively in shunt with the high frequency coil are two condensers 5 and 5' to form a pair of high frequency tuning circuits 6 and 6'.

In order to detect the inductance variations of the tuning circuits 6 and 6', in this example, a high frequency current generator 8 is provided which is associated to the tuning circuits 6 and 6' through a high frequency transformer 19 and a balanced circuit referred to hereinafter. That is, the transformer has a primary winding 20 and two secondary windings 21 and 21' and one terminal of the winding 21 is connected to the plate of a vacuum tube 22, while the other end thereof is led to plus side of a B battery or other direct current source and at the same time to a load circuit 23. The tuning circuit 6 is inserted through a bias circuit 24 into the grid circuit of the vacuum tube 22. The connecting relationship between the ohter secondary winding 21' of the transformer and the other tuning circuit 6' is similar to that above described so that throughout these parts the same numerals dashed are used to designate similar parts and further detailed explanation is omitted for the sake of simplicity.

The operation of the above arrangements and connections is as follows:

The cores 14 and 15 are biased in the reverse directions by the same value H*b* of a direct current magnetic field force. The fluxes induced in the core members 12 from the tape 1, however, are in the same directions so that the inductance of the coil 4 varies oppositely to that of the coil 4' with the varying signal flux. In this case, there appears no direct current biasing field in the air gap 9 because of the fact that the two direct current magnetic paths are symmetrical in disposition and hence the magneto-motive force in the both magnetic paths are equal in magnitude and reverse in polarity. As seen from the diagram, inductance of each inductance coil has the same value illustrated as at $a_0$ with no signal, but inductance of the coil 4' is reduced along the curve $a$, while that of the coil 4 is increased along the curve $a'$, if a signal field becomes $h$. The difference of these inductances in this instant forms the resultant inductance variation which is detected by the detecting circuit. The voltage changes corresponding to the inductance variations of the high frequency coils 4 and 4' are respectively applied to the grids of the vacuum tubes 22 and 22'. Accordingly, the high frequency currents in the anode circuits of the tubes respectively vary with the inductance variations. These current variations are added across the opposite terminals of the load circuits 23 and 23' so that this system increases the dynamic range of the reproduction without distortion.

Figure 6:
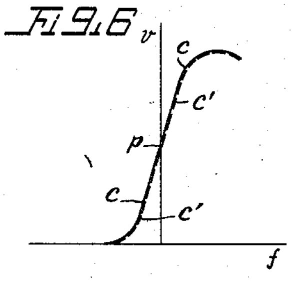
Fig. 6 is a diagram illustrating the signal output voltages in the detecting circuits shown in Fig. 4.

Fig. 6 shows the characteristic curves of the circuits shown in Fig. 4, the abscissa indicating frequency and the ordinate the output in volts. The upper half circuit and the lower half one have respectively the detected output voltage curves $c$ and $c'$ which fall substantially on the same trace. The points P on these curves intersecting with the ordinate are the voltage values in no signalling. Upon signalling the output voltages of the circuits vary from the points P in the opposite directions corresponding to the deviations from the resonant frequency so that the output voltages are added as explained hereinbefore, but all of the outer conditions such as fluctuations of the oscillation frequency and A. C. current sources, and inductance variations due to the outer temperatures affects differentially, and hence no influence is given to the output. If such a condition is not necessary, however, either one of the inductance coils 4 and 4' can be dispensed with or disconnected from the cooperating electrical circuit. The operation and merit in this case are substantially the same as those of the system shown in Fig. 1.

While we have shown particular embodiments of our invention, it will be understood, of course, that we do not wish to be limited thereto since many modifications may be made and we, therefore, contemplate by the appended claims to cover any such modifications as fall within the spirit and scope of our invention.

What is claimed is:

1. In a magnetic reproducing system utilizing a magnetic medium, apparatus comprising an oscillator for producing a high frequency alternating current, a magnetic reproducing head, a core member of said magnetic head having a portion forming an air gap adjacent which the recorded magnetic medium passes, a first pair of cores each having a small cross sectional area compared with that of the portion forming the air gap, a permanent magnet forming a pair of direct current magnetic paths each including said cores, said cores being symmetrically disposed with respect to said core member so that resultant direct current magnetic fluxes cancel each other in said air gap, a second pair of cores each being positioned opposite to each of the first cores, a pair of high frequency inductance coils each being wound on one of said second cores, capacitors in parallel with said high frequency inductance coils forming a pair of tuning circuits, and a pair of electrical circuits each being connected to said tuning circuits and operatively associated with said oscillator to detect a tuning deviation of said tuning circuits with respect to said high frequency alternating current in accordance with signals recorded on the magnetic medium, the outputs of said electrical circuits being connected so as to produce a voltage corresponding to the sums of the inductance variations of said high frequency inductance coils.

2. Apparatus as claimed in claim 1 wherein said magnetic reproducing head comprises an inner core member positioned within the first said core member and magnetically coupled thereto by the first pair of cores.

3. Apparatus as claimed in claim 1 wherein said first and second pairs of cores cooperatively define air gaps.

4. Apparatus as claimed in claim 1 wherein the pairs of direct current magnetic paths define air gaps.

References Cited in the file of this patent

UNITED STATES PATENTS

| | | |
|---|---|---|
| 2,536,260 | Burns | Jan. 2, 1951 |
| 2,628,287 | Haynes | Feb. 10, 1953 |
| 2,722,569 | Loper | Nov. 1, 1955 |

FOREIGN PATENTS

| | | |
|---|---|---|
| 875,721 | France | June 29, 1942 |
| 882,888 | France | Mar. 8, 1943 |